United States Patent
Shigematsu

(10) Patent No.: US 12,486,602 B2
(45) Date of Patent: Dec. 2, 2025

(54) NON-WOVEN FABRIC FOR SUPPORTING SOLID ELECTROLYTE, AND SOLID ELECTROLYTE SHEET

(71) Applicant: MITSUBISHI PAPER MILLS LIMITED, Tokyo (JP)

(72) Inventor: Toshihiro Shigematsu, Tokyo (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 587 days.

(21) Appl. No.: 17/914,589

(22) PCT Filed: Mar. 26, 2021

(86) PCT No.: PCT/JP2021/012789
§ 371 (c)(1),
(2) Date: Sep. 26, 2022

(87) PCT Pub. No.: WO2021/200621
PCT Pub. Date: Oct. 7, 2021

(65) Prior Publication Data
US 2023/0193534 A1 Jun. 22, 2023

(30) Foreign Application Priority Data

Mar. 31, 2020 (JP) ................................ 2020-063552

(51) Int. Cl.
| | | |
|---|---|---|
| *D04H 1/44* | (2006.01) | |
| *B32B 5/02* | (2006.01) | |
| *B32B 5/26* | (2006.01) | |
| *D04H 1/541* | (2012.01) | |
| *D04H 1/544* | (2012.01) | |
| *D04H 3/007* | (2012.01) | |
| *D04H 3/16* | (2006.01) | |
| *H01M 10/0562* | (2010.01) | |

(52) U.S. Cl.
CPC .............. *D04H 1/44* (2013.01); *B32B 5/022* (2013.01); *B32B 5/266* (2021.05); *B32B 5/268* (2021.05); *D04H 1/5412* (2020.05); *D04H 1/5418* (2020.05); *D04H 1/544* (2013.01); *D04H 3/007* (2013.01); *D04H 3/16* (2013.01); *H01M 10/0562* (2013.01); *B32B 2250/20* (2013.01); *B32B 2260/023* (2013.01); *B32B 2260/046* (2013.01); *B32B 2262/0223* (2013.01); *B32B 2262/0253* (2013.01); *B32B 2262/124* (2021.05); *B32B 2262/144* (2021.05); *B32B 2264/107* (2013.01); *B32B 2307/724* (2013.01); *B32B 2457/10* (2013.01); *D10B 2321/021* (2013.01); *D10B 2321/022* (2013.01); *D10B 2321/06* (2013.01); *D10B 2331/04* (2013.01); *D10B 2505/02* (2013.01)

(58) Field of Classification Search
None
See application file for complete search history.

(56) References Cited

U.S. PATENT DOCUMENTS

| | | | | |
|---|---|---|---|---|
| 6,586,137 | B1 * | 7/2003 | Tanaka ................ | H01M 50/417 429/142 |
| 2014/0295299 | A1 * | 10/2014 | Kondo .................. | H01M 12/06 429/407 |
| 2015/0255768 | A1 * | 9/2015 | Konishi ............. | D04H 1/43835 429/144 |
| 2017/0062785 | A1 * | 3/2017 | Shi ........................ | B32B 27/308 |
| 2018/0047964 | A1 * | 2/2018 | Natesh .................... | B32B 27/12 |
| 2020/0144661 | A1 * | 5/2020 | Ogawa .............. | H01M 10/0525 |
| 2020/0173074 | A1 * | 6/2020 | Tanaka ................ | H01M 50/489 |
| 2020/0208351 | A1 * | 7/2020 | Harada ..................... | B32B 5/08 |
| 2020/0295403 | A1 * | 9/2020 | Hotta .................. | H01M 8/1053 |
| 2023/0170523 | A1 * | 6/2023 | Katagiri .............. | H01M 50/414 429/322 |
| 2023/0282943 | A1 * | 9/2023 | Kusakabe ........... | H01M 50/491 429/254 |
| 2024/0063507 | A1 * | 2/2024 | Morimoto ........... | H01M 50/494 |

FOREIGN PATENT DOCUMENTS

| | | |
|---|---|---|
| JP | 11-273653 | 10/1999 |
| JP | 2003-157897 | 5/2003 |
| JP | 2005-330643 | 12/2005 |
| JP | 2013-204154 | 10/2013 |
| JP | 2014-049222 | 3/2014 |
| JP | 2014049222 A * | 3/2014 |
| JP | 2014-60119 | 4/2014 |

(Continued)

OTHER PUBLICATIONS

Extended European Search Report issued Mar. 18, 2024 in European Patent Application No. 21779732.3.
Office Action issued Apr. 27, 2024, in corresponding Chinese Patent Application No. 202180025104.6, with English-language translation.
Jiankun et al., ed., "Novel Spinning Technique", China Textile Press Limited, Oct. 2019, p. 45, cited on p. 6, first paragraph of Office Action.
S. Adana, ed., "Performance and Process of Fabrics", Wellington Industrial Textile Handbook, China Textile Press, Sep. 2000, pp. 485-486, cited on p. 6, first paragraph of Office Action.

(Continued)

*Primary Examiner* — Kevin M Bernatz
(74) *Attorney, Agent, or Firm* — Wenderoth, Lind & Ponack, L.L.P.

(57) ABSTRACT

The present invention provides a non-woven fabric for supporting a solid electrolyte in which heat-fusible composite fibers with a crimp are contained in an amount of not less than 60 mass % and not more than 100 mass % and are heat-fused, and a solid electrolyte sheet. The non-woven fabric for supporting a solid electrolyte is excellent in process performance, is satisfactorily filled with a solid electrolyte, is suitable for achieving a thin solid electrolyte sheet, and has few hole defects. The solid electrolyte sheet is excellent in self-sustainability and flexibility.

6 Claims, No Drawings

(56) References Cited

FOREIGN PATENT DOCUMENTS

| | | | |
|---|---|---|---|
| JP | 2015-41458 | | 3/2015 |
| JP | 2015041458 A | * | 3/2015 |
| JP | 2016-31789 | | 3/2016 |
| JP | 2016-139482 | | 8/2016 |
| JP | 2018-101641 | | 6/2018 |
| JP | 2020-24860 | | 2/2020 |
| JP | 2020024860 A | * | 2/2020 |
| WO | 2011/096502 | | 8/2011 |
| WO | 2020/054081 | | 3/2020 |

OTHER PUBLICATIONS

Office Action issued Jan. 28, 2025 in corresponding Japanese Patent Application No. 2022-512102, with English-language Translation.
International Search Report (ISR) issued Jun. 15, 2021 in International (PCT) Application No. PCT/JP2021/012789.

* cited by examiner

NON-WOVEN FABRIC FOR SUPPORTING SOLID ELECTROLYTE, AND SOLID ELECTROLYTE SHEET

TECHNICAL FIELD

The present invention relates to a non-woven fabric for supporting a solid electrolyte, and a solid electrolyte sheet having the non-woven fabric for supporting a solid electrolyte and a solid electrolyte. Hereinafter, the term "non-woven fabric for supporting a solid electrolyte" may be abbreviated as "supporting non-woven fabric".

BACKGROUND ART

In recent years, there has been a growing demand for high-capacity and high-performance secondary batteries such as lithium batteries for use in portable information terminals, mobile electronics, small-scale household power storage devices, motor-driven two-wheeled vehicles, electric vehicles, hybrid electric vehicles and the like. As secondary batteries have a wider range of application, they are required to provide further enhanced safety and performance.

The use of a solid electrolyte in substitution for an organic medium electrolyte is an effective way to ensure the safety of lithium batteries. A solid electrolyte, which is non-flammable in nature, is more secure than a commonly used organic medium electrolyte. It has been anticipated to develop all-solid-state lithium batteries with excellent safety using such a solid electrolyte. An all-solid-state lithium battery includes a solid electrolyte layer, a positive electrode active material layer, a negative electrode active material layer, and current collecting members joined to the respective active material layers. A preferred example of the solid electrolyte is a sulfide-based solid electrolyte which is excellent in lithium ion conductivity.

The solid electrolyte for use in all-solid-state lithium batteries is usually in powder form and, thus, is required to have a sheet-like form for convenience in handling. However, it has been difficult to form a single-layered thin film sheet made only of the powder solid electrolyte. Nevertheless, a thinner solid electrolyte layer has been desired because the lithium ion conductivity in the solid electrolyte depends on the thickness of the solid electrolyte layer.

To solve this problem, Patent Document 1 discloses a solid electrolyte sheet obtained by applying a coating liquid containing a solid electrolyte to a non-woven fabric with a weight per square meter of not more than 8 g and a thickness of not less than 10 μm and not more than 25 μm by screen printing or the like, followed by drying.

Further, Patent Document 2 discloses a solid electrolyte sheet including an insulating porous base material as a support.

The insulating porous base material is made of a fibrous material, is filled inside with solid electrolyte particles, contains a binder for joining the solid electrolyte particles together, and has a thickness of not less than 70% of the thickness of the solid electrolyte sheet.

Patent Document 1 discloses in Examples polyethylene terephthalate (PET) non-woven fabrics with a basis weight of 3 to 8 $g/m^2$ which are produced by forming PET fibers into a sheet by wet paper making. Patent Document 2 discloses in Example a PET non-woven fabric which is prepared as the insulating porous base material. These PET non-woven fabrics are well filled with the solid electrolyte, but are extremely low in tensile strength, resulting in unsatisfactory process performance. To prevent this problem, in Examples of Patent Document 1, a PET film as a support base material is used, so as to cause an increase in production cost. Further, since the PET non-woven fabrics used in Patent Documents 1 and 2 are liable to absorb moisture, drying of the non-woven fabrics is necessary, which contributes to decreased productivity. Furthermore, when the solid electrolyte sheet is pressed into a thin film, a crack, originating from fibers, is prone to be created in the solid electrolyte layer, which poses a problem in thinning and ensuring self-sustainability.

Further, Patent Document 1 teaches that a sheet-like non-woven fabric formed by wet paper making is preferred. However, in the production of a non-woven fabric with an extremely low basis weight, constituent fibers may be caught on a paper making wire or a blanket for supporting wet paper and then fall off to create a hole defect. As a result, the solid electrolyte cannot be supported in the hole defect region.

Patent Document 3 discloses a non-woven fabric for supporting a solid electrolyte on its surface and inside. This non-woven fabric for supporting a solid electrolyte contains a fibrillated heat-resistant fiber and a synthetic resin short fiber. The content of the fibrillated heat-resistant fiber is not less than 2 mass, and not more than 40 mass % relative to the total fiber component contained in the non-woven fabric for supporting a solid electrolyte. The synthetic resin short fiber is a core-sheath type composite fiber whose core is a resin with a melting point of not less than 160° C. and sheath is a polyethylene resin. However, the non-woven fabric for supporting a solid electrolyte disclosed in Patent Document 3 has the following problems. When particles of a solid electrolyte have a large diameter or a coating liquid containing the solid electrolyte has high viscosity, it takes a long time to impregnate the non-woven fabric with the solid electrolyte, and it is difficult to thoroughly fill the non-woven fabric with the solid electrolyte. Further, if the fibrillated heat-resistant fiber contains a thick stem fiber, a crack, originating from the stem fiber, is prone to be created in the solid electrolyte layer when the solid electrolyte sheet is pressed into a thin film, which poses a problem in thinning.

PRIOR ART DOCUMENTS

Patent Documents

Patent Document 1: JP-A-2016-31789
Patent Document 2: Pamphlet of WO 2020/54081
Patent Document 3: JP-A-2020-24860

SUMMARY OF THE INVENTION

Problems to be Solved by the Invention

An object of the present invention is to provide a non-woven fabric for supporting a solid electrolyte that is excellent in process performance, is satisfactorily filled with a solid electrolyte, is suitable for achieving a thin solid electrolyte sheet, and has few hole defects, and a solid electrolyte sheet excellent in self-sustainability and flexibility.

Means for Solving the Problems

As a result of an intensive study to achieve the above-described problems, the following present invention has been developed.

(1) A non-woven fabric for supporting a solid electrolyte, being a non-woven fabric A in which heat-fusible composite fibers with a crimp are contained in an amount of not less than 60 mass % and not more than 100 mass % and are heat-fused.
(2) The non-woven fabric for supporting a solid electrolyte according to (1), wherein the number of crimps of each of the heat-fusible composite fibers with a crimp is 6 to 25/inch.
(3) The non-woven fabric for supporting a solid electrolyte according to (1) or (2), wherein each of the heat-fusible composite fibers with a crimp is a core-sheath type heat-fusible composite fiber whose core comprises a polypropylene-based polymer and sheath comprises a polyolefin-based polymer with a lower melting point than the polypropylene-based polymer as the core, and has a fineness of 0.1 to 0.4 dtex.
(4) The non-woven fabric for supporting a solid electrolyte according to any one of (1) to (3), wherein the non-woven fabric A has an air permeability of 150 to 2500 cm$^3$/cm$^2$·sec.
(5) The non-woven fabric for supporting a solid electrolyte according to any one of (1) to (3), wherein a non-woven fabric B made of nanofibers with an average fiber diameter of not more than 2 μm is laminated on at least one surface of the non-woven fabric A.
(6) The non-woven fabric for supporting a solid electrolyte according to (5), wherein the non-woven fabric B is a non-woven fabric formed by a melt-blown method or an electrospinning method.
(7) A solid electrolyte sheet comprising: a non-woven fabric for supporting a solid electrolyte according to any one of (1) to (6); and a solid electrolyte supported in the non-woven fabric for supporting a solid electrolyte.

Effects of the Invention

The non-woven fabric for supporting a solid electrolyte of the present invention is excellent in process performance, is satisfactorily filled with a solid electrolyte, is suitable for achieving a thin solid electrolyte sheet, and has few hole defects. Further, the present invention can achieve effects such that the solid electrolyte sheet having a lithium ion conducting solid electrolyte and the non-woven fabric for supporting a solid electrolyte of the present invention is excellent in self-sustainability and flexibility.

MODE FOR CARRYING OUT THE INVENTION

A description will be given of an example of the structure of an all-solid-state lithium battery. An all-solid-state lithium battery includes a positive electrode current collecting member, a positive electrode active material layer, a solid electrolyte layer, a negative electrode active material layer, and a negative electrode current collecting member. The present invention is not limited to the following embodiment.

The positive electrode current collecting member and the negative electrode current collecting member are not particularly limited as long as they are a conductive body. Examples include a plate-like body and a foil-like body made of copper, magnesium, stainless steel, titanium, iron, cobalt, nickel, zinc, aluminum, germanium, indium, lithium, or an alloy thereof.

The positive electrode active material layer contains a solid electrolyte, a positive electrode active material, a positive electrode layer conductive aid, and a positive electrode layer binder.

The solid electrolyte preferably contains at least lithium sulfide as a primary component and at least one compound selected from the group consisting of silicon sulfide, phosphoric sulfide, and boron sulfide as a secondary component; the solid electrolyte contains particularly preferably $Li_2S$—$P_2S_5$. The sulfide-based solid electrolyte is known for higher lithium ion conductivity than one made of other inorganic compounds. The solid electrolyte may further contain such sulfides as $SiS_2$, $GeS_2$, and $B_2S_3$ in addition to $Li_2S$—$P_2S_5$. Further, the solid electrolyte may be added, as appropriate, with $Li_3O_4$, a halogen, a halogen compound or the like.

The sulfide-based solid electrolyte is obtained by melt-mixing $Li_2S$ and $P_2S_5$ at a predetermined ratio while heating them to a temperature not less than their melting temperatures, and holding the mixture for a predetermined time, followed by quenching (melt-quenching). The predetermined time for the heat treatment is preferably not less than 0.1 hours. The mixture may be quenched by being introduced into liquid nitrogen, which results in a desired vitrified solid electrolyte. Alternatively, $Li_2S$ and $P_2S_5$ may be vacuum-sealed in a glass tube and then heated and melted, followed by quenching with ice water or the like. Further alternatively, the surface based solid electrolyte can also be obtained by $Li_2S$—$P_2S_5$ mechanical milling. The sulfide represented by $Li_2S$—$P_2S_5$ is obtained by mixing $Li_2S$ and $P_2S_5$ preferably at a molar ratio of 50:50 to 80:20, more preferably at a molar ratio of 60:40 to 75:25, for example.

The solid electrolyte other than the sulfide-based solid electrolyte, which contains a lithium ion conductor comprising inorganic compounds as an inorganic solid electrolyte, may be included. Examples of the lithium ion conductor include $Li_3N$, LISICON, LiPON ($Li_{3+y}PO_{4-x}N_x$), Thio-LISICON ($Li_{3.25}Ge_{0.25}P_{0.75}S_4$), and $Li_2O$—$Al_2O_3$—$TiO_2$—$P_2O_5$ (LATP).

The solid electrolyte has an amorphous structure, a glass-like structure, a crystal (crystallized glass) structure or the like. The solid electrolyte in each of the positive electrode active material layer, the negative electrode active material layer, and the electrolyte layer is composed, for example, of a mixture of an amorphous body and a crystalline body. The amorphous body can be produced by mixing the aforementioned primary and secondary sulfide components, followed by mechanical milling. The crystalline body can be produced, for example, by baking the amorphous body.

The positive electrode active material is not particularly limited as long as it is capable of reversibly occluding and releasing lithium ions. Examples include lithium cobalt oxide (LCO), lithium nickel oxide, lithium nickel cobalt oxide, lithium nickel cobalt aluminum oxide (hereinafter, may be abbreviated as "NCA"), lithium nickel cobalt manganese oxide (hereinafter, may be abbreviated as "NCM"), lithium manganese oxide, lithium iron phosphate, nickel sulfide, copper sulfide, sulfur, iron oxide, and vanadium oxide. Any of these positive electrode active materials may be used alone or in combination with one or more of the other materials.

The positive electrode active material is particularly preferably a lithium salt of transition metal oxide with a layered rock salt structure. As used herein, the term "layered" refers to a thin sheet-like form, and the term "rock salt structure" refers to a sodium chloride structure, as a type of crystal structure, in which face-centered cubic lattices of cations and anions, respectively, are displaced from one another by one half of the edge of a unit cell. Examples of the lithium salt of transition metal oxide with the layered rock salt structure include lithium salts of ternary transition metal oxides represented by $Li_{1.1-x}Ni_yCo_zAl_{1-y-z}O_2$ (NCA) and $Li_{1.1-x}Ni_yCo_zMn_{1-y-z}O_2$ (NCM) ($0<x<0.6$, $0<y<1$, $0<z<1$, and $y+z<1$).

The positive electrode layer conductive aid is added to form a conductive network in the positive electrode active material, thereby reducing the resistance of the positive electrode active material layer. The positive electrode active material layer may contain an appropriate amount of the conductive aid. Examples of the positive electrode layer conductive aid include carbon black such as KETJEN-BLACK and acetylene black, graphite, natural graphite, a carbon nanotube, and a carbon nanofiber. Any of these conductive aids can be used with no particular limitation as long as it increases the conductivity of the positive electrode layer, and may be used alone or in combination with one or more of the other conductive aids.

Examples of the positive electrode layer binder include styrene-based thermoplastic elastomers such as SBS (styrene butadiene styrene block polymer), SEBS (styrene ethylene butadiene styrene block polymer), and a styrene-styrene butadiene-styrene block polymer, SBR (styrene butadiene rubber), BR (butadiene rubber), NR (natural rubber), IR (isoprene rubber), EPDM (ethylene-propylene-diene terpolymer), NBR (nitrile rubber), CR (chloroprene rubber) and partial hydrides thereof, or full hydrides thereof, a copolymer of polyacrylic ester, PVDF (polyvinylidene fluoride), PVDF-HFP (vinylidene fluoride-hexafluoropropylene copolymer), carboxylic acid modified products thereof, CM (chlorinated polyethylene), a polymethacrylic acid ester, polyvinyl alcohol, an ethylene-vinyl alcohol copolymer, polyimide, polyamide, and polyamideimide. In addition, polystyrene, a polyolefin, a polyolefin-based thermoplastic elastomer, a polycyclic olefin, a silicone resin and the like are also available.

The proportion of the solid electrolyte, the positive electrode active material, the positive electrode layer conductive aid, and the positive electrode layer binder to be contained in the positive electrode active material layer is not particularly limited. For example, the solid electrolyte, the positive electrode active material, the positive electrode layer conductive aid, and the positive electrode layer binder are contained preferably in amounts of 3 to 50 mass %, 45 to 95 mass %, 1 to 10 mass %, and 0.5 to 4 mass %, respectively, relative to the total mass of the positive electrode active material layer.

The solid electrolyte layer, which is formed of a solid electrolyte sheet of the present invention, is produced as a self-sustainable solid electrolyte sheet by using a supporting non-woven fabric to be described later and the solid electrolyte to be supported therein. The solid electrolyte may be supported with an electrolyte binder. Considering that the solid electrolyte, especially the sulfide-based solid electrolyte, has high reactivity, the electrolyte binder is preferably a non-polar resin with no polar functional groups. The electrolyte binder in the solid electrolyte layer preferably contains the above-described positive electrode layer binder.

The proportion of the solid electrolyte and the electrolyte binder to be contained in the solid electrolyte layer is not particularly limited. For example, the solid electrolyte and the electrolyte binder are contained preferably in amounts of 95 to 99.5 mass % and 0.5 to 5 mass %, respectively, relative to the total mass of the solid electrolyte and the electrolyte binder.

A description will be given of a method for producing the solid electrolyte sheet of the present invention. The solid electrolyte sheet of the present invention can be produced in the following manner: The solid electrolyte is dissolved or dispersed in a medium to prepare a solid electrolyte slurry (coating liquid containing the solid electrolyte), which is applied to a supporting non-woven fabric, followed by drying. The medium for use in the preparation of the solid electrolyte slurry is not particularly limited as long as it has no adverse influence on the performance of the solid electrolyte. Examples of the medium include non-aqueous media for use in the preparation of an electrolyte solution, such as dry heptane, toluene, hexane, tetrahydrofuran (THF), N-methylpyrrolidone, acetonitrile, dimethoxyethane, and dimethylcarbonate. The water content of the medium is preferably not more than 100 ppm, more preferably not more than 50 ppm.

Various coaters are available as a device for applying the solid electrolyte slurry to one or both surfaces of the supporting non-woven fabric. Examples include a gravure coater, a die coater, a lip coater, a blade coater, a curtain coater, an air knife coater, a rod coater, a roll coater, a kiss touch coater, and a dip coater.

The application of the solid electrolyte slurry is followed by drying, thereby forming the solid electrolyte layer. Drying can be carried out with a drying device that works by using hot air, a heater, high-frequency waves, or the like. The solid electrolyte sheet may be dried from one or both surfaces thereof. At this time, it is necessary to adjust the drying conditions so as to ensure sufficient removal of the medium in the solid electrolyte slurry. In the case of hot air drying, for example, it is necessary to optimally adjust temperature and air volume. The dried solid electrolyte sheet, which can be used as it is, can be further subjected to a pressure treatment such as pressurizing (press) or heating and pressurizing (hot press) to ensure increased strength. The pressure treatment can be performed by sheet press, roll press, or the like. If the pressure of the pressure treatment is low, the solid electrolyte layer may be uneven in thickness. If the pressure is high, the solid electrolyte layer, including the supporting non-woven fabric, may be damaged.

The negative electrode active material layer contains a negative electrode active material, a negative electrode layer binder, and the solid electrolyte. The negative electrode active material layer binder can be any of the above binders described as the positive electrode layer binder.

Examples of the negative electrode active material include graphite-based active material graphite such as artificial graphite, natural graphite, a mixture of artificial graphite and natural graphite, and natural graphite coated with artificial graphite; a metallic lithium, a silicon alloy, and a tin alloy. A graphite powder may be at least partially coated with an inorganic compound, metal or the like.

The proportion of the negative electrode active material, the solid electrolyte, and the negative electrode layer binder to be contained is not particularly limited. For example, the sulfide-based solid electrolyte, the negative electrode active material, and the negative electrode layer binder are contained preferably in amounts of 0 to 40 mass %, 60 to 99.5 mass %, and 0.5 to 5 mass %, respectively, relative to the total mass of the negative electrode active material layer.

Next, a description will be given of a non-woven fabric for supporting a solid electrolyte of the present invention. The non-woven fabric for supporting a solid electrolyte is a non-woven fabric that is designed to support the solid electrolyte.

The non-woven fabric for supporting a solid electrolyte of the present invention is a non-woven fabric A in which heat-fusible composite fibers with a crimp are contained and are heat-fused. The content of the heat-fusible composite fibers with a crimp is not less than 60 mass % and not more than 100 mass %. Hereinafter, the term "heat-fusible composite fiber(s) with a crimp" may be abbreviated as "heat-fusible crimped composite fiber(s)".

Due to the inclusion of the heat-fusible crimped composite fibers, the non-woven fabric can be prevented from having an extremely film-like form by heat fusion. Further, the non-woven fabric A becomes bulky, so that it is likely to have good air permeability and is easily filled with the solid electrolyte. Moreover, since the heat-fusible crimped composite fibers are easily entangled with other fibers, the supporting non-woven fabric can be imparted with high tensile strength.

Examples of the type of the heat-fusible crimped composite fiber include a core-sheath type, an eccentric type, a side-by-side type, a sea-island type, an orange type, and a multi-bimetal type. The heat-fusible crimped composite fiber may be one type of composite fiber or a mixture of two or more types of composite fibers. The heat-fusible crimped composite fiber in the present invention is preferably a core-sheath type composite fiber. A composite fiber is made of two or more types of resins. The heat-fusible crimped composite fiber in the present invention is preferably made of a resin with a melting point of not less than 160° C. and a resin with a melting point of less than 160° C. In the core-sheath type heat-fusible crimped composite fiber, it is preferable that a core resin has a melting point of not less than 160° C. and a sheath resin has a melting point of less than 160° C.

The core resin having a melting point of not less than 160° C. serves to easily hold the fiber form in this resin region. More preferably, the melting point of this resin is not less than 163° C. In the present invention, the melting point is measured in conformity with JIS K7121:2012.

Examples of the resin with a melting point of not less than 160° C. include polyester, acryl, a polypropylene-based polymer (PP), wholly aromatic polyester, wholly aromatic polyester amide, polyamide, semi-aromatic polyamide, wholly aromatic polyamide, wholly aromatic polyether, wholly aromatic polycarbonate, polyimide, polyamide imide (PAI), polyether ether ketone (PEEK), polyphenylene sulfide (PPS), poly-p-phenylene benzobisoxazole (PBO), polybenzimidazole (PBI), polytetrafluoroethylene (PTFE), and an ethylene-vinyl alcohol copolymer. Among them, polyester, acryl, a polypropylene-based polymer, wholly aromatic polyester, wholly aromatic polyester amide, polyamide, semi-aromatic polyamide, and wholly aromatic polyamide are preferable; polyester, acryl, and a polypropylene-based polymer are more preferable; and a polypropylene-based polymer is particularly preferable in terms of fiber spinning.

The sheath resin preferably has a melting point of less than 160° C. Examples of the resin with a melting point of less than 160° C. include: a polyethylene-based polymer (PE) such as high-, medium-, or low-density polyethylene or linear low-density polyethylene; a copolymer of propylene and another type of α-olefin such as a propylene-buten-1 random copolymer or a propylene-ethylene-buten-1 random copolymer; an amorphous polypropylene-based polymer such as soft polypropylene; and a polyolefin-based polymer such as poly 4-methylpentene-1. Other examples include polyester, an acrylic resin, polyvinyl alcohol, an ethylene-vinyl alcohol copolymer, an ethylene-vinyl acetate alcohol copolymer, and low-melting polyester (modified polyester). The sheath resin is preferably a polyolefin-based polymer with a lower melting point than the core resin, and particularly preferably a polyethylene-based polymer in terms of fiber spinning, adhesiveness, and solvent resistance.

In order to prevent the non-woven fabric for supporting a solid electrolyte from having an extremely film-like form on its surface, the resin with a melting point of less than 160° C. preferably has a melting point of not less than 115° C. Meanwhile, in order to enhance the adhesiveness of the core-sheath type heat-fusible crimped composite fiber, the resin with a melting point of less than 160° C. more preferably has a melting point of not more than 140° C.

The ratio of the resin with a melting point of not less than 160° C. to the resin with a melting point of less than 160° C. in the heat-fusible crimped composite fiber is not particularly limited. The mass ratio is preferably in a range of 7:3 to 3:7, more preferably in a range of 6:4 to 4:6, and particularly preferably 5:5 or close thereto (5.5:4.5 to 4.5:5.5). In the heat-fusible crimped composite fiber, the resin with a melting point of not less than 160° C. and/or the resin with a melting point of less than 160° C. may be only one type of resin or a combination of two or more types of resins.

In the present invention, the content of the heat-fusible crimped composite fiber is 60 to 100 mass %, more preferably 70 to 95 mass %, and still more preferably 80 to 90 mass % relative to the total fiber component of the non-woven fabric A. The heat-fusible crimped composite fiber contained in an amount of 60 to 100 mass % facilitates strong fiber adhesion by being melted, allowing the supporting non-woven fabric to have increased tensile strength. Further, since fiber adhesion is also enhanced on the surface of the supporting non-woven fabric, it can be less fluffy on its surface. Furthermore, in the hot press step to make the solid electrolyte sheet thinner, when the heat-fusible crimped composite fiber is melted, the adhesiveness between the supporting non-woven fabric and the solid electrolyte is increased, and the solid electrolyte sheet can be made thinner with no crack created in the solid electrolyte layer.

The fineness of the heat-fusible crimped composite fiber is preferably not more than 0.9 dtex, more preferably 0.06 to 0.5 dtex, still more preferably 0.1 to 0.4 dtex, and particularly preferably 0.2 to 0.3 dtex. If the fineness of the heat-fusible crimped composite fiber is less than 0.06 dtex, the fiber is so fine that the supporting non-woven fabric will be liable to have a film-like form. On the other hand, if the fineness of the heat-fusible crimped composite fiber is more than 0.9 dtex, fewer fibers are allowed to be contained per mass, so that fiber adhesion is achieved at fewer sites. As a result, the non-woven fabric may have low tensile strength. Also, the non-woven fabric may become thick. Using the heat-fusible crimped composite fiber with a particularly preferable fineness of 0.2 to 0.3 dtex makes it possible to easily achieve the supporting non-woven fabric that is desirably thin, is suitably dense, adheres well to the solid electrolyte layer, and is satisfactorily impregnated with the solid electrolyte slurry.

The air permeability of the non-woven fabric A is preferably 150 to 2500 $cm^3/cm^2 \cdot sec$, more preferably 200 to 2000 $cm^3/cm^2 \cdot sec$, and still more preferably 250 to 1500 $cm^3/cm^2$ sec.

The air permeability of the non-woven fabric A can be adjusted based on the basis weight, thickness, fiber type, and fiber diameter of the non-woven fabric A. If the air permeability of the non-woven fabric A is less than 150 $cm/cm^2$ sec, the supporting non-woven fabric is so dense that it may have difficulty in being filled with the solid electrolyte. On the other hand, if the air permeability of the supporting non-woven fabric is more than 2500 $cm^3/cm^2 \cdot sec$, the supporting non-woven fabric has low density. As a result, the supporting non-woven fabric may be unevenly applied with the solid electrolyte and have a through hole. Also, the solid electrolyte layer may lack uniformity. In addition, tensile strength of the supporting non-woven fabric lower, with result that it may be wrinkled during the process of filling the supporting non-woven fabric with the solid electrolyte due to deteriorated process performance.

The heat-fusible composite fiber may be crimped by, for example, mechanical pressing in which the fiber is buckled by a pair of pressing rollers and a stuffer box. When the heat-fusible composite fiber is a bimetal composite fiber or an asymmetric composite fiber such as an eccentric composite fiber, it is self-crimped by a heat treatment.

The number of crimps of the heat-fusible crimped composite fiber is preferably 6 to 25/inch, more preferably 8 to 22/inch, and still more preferably 10 to 18/inch. If the number of crimps is less than 6/inch, the supporting non-woven fabric will be less likely to be bulky, which may impair the effect of increasing air permeability and tensile strength. On the other hand, if the number of crimps is more than 25/inch, the supporting non-woven fabric will be uneven in basis weight, which may result in poor fabric formation. Further, the supporting non-woven fabric will be so thick that the fabric, after being allowed to support the solid electrolyte, may have difficulty in being hot-pressed into a thin film.

The non-woven fabric A of the present invention may contain fibers other than the heat-fusible crimped composite fiber. One of the fibers other than the heat-fusible crimped composite fiber may be a so-called straight-type fiber with no crimp. Examples of the fiber with no crimp include fibers made of a synthetic resin such as a polyolefin, polyester, polyvinyl acetate, an ethylene-vinyl acetate copolymer, polyamide, an acrylic resin, polyvinyl chloride, polyvinylidene chloride, polyvinyl ether, a polyvinyl ketone, polyether, polyvinyl alcohol, a diene resin, polyurethane, a phenol resin, a melamine resin, a furan resin, a urea resin, an aniline resin, unsaturated polyester, a fluorine resin, a silicon resin, or a derivative thereof. In order to adjust the tensile strength and piercing strength of the supporting non-woven fabric, the non-woven fabric A is allowed to contain the fibers other than the heat-fusible crimped composite fiber.

The fiber other than the heat-fusible crimped composite fiber may be a fiber made of a single resin (single fiber) or a composite fiber made of two or more resins. Further, the fiber other than the heat-fusible crimped composite fiber may be used alone or in combination with one or more other fibers. Examples of the type of the composite fiber include a core-sheath type, an eccentric type, a side-by-side type, a sea-island type, an orange type, and a multi-bimetal type.

The fineness of the fiber other than the heat-fusible crimped composite fiber is preferably not less than 0.01 dtex and not more than 0.6 dtex, more preferably not less than 0.02 dtex and not more than 0.3 dtex. If the fineness is more than 0.6 dtex, the number of fibers in the thickness direction becomes small, resulting in a broad pore size distribution. As a result, the supporting non-woven fabric will be likely to be less effectively applied with the solid electrolyte slurry, and the adhesiveness between the supporting non-woven fabric and the solid electrolyte layer may be reduced. On the other hand, if the fineness is less than 0.01 dtex, the fiber is so expensive that it may be difficult to ensure stable fiber manufacturing. Further, the productivity of producing the supporting non-woven fabric by wet paper making may be reduced.

The fiber length of the heat-fusible crimped composite fiber is preferably not less than 1 mm and not more than 10 mm, more preferably not less than 1 mm and not more than 5 mm. If the fiber length is more than 10 mm, the fabric may be poor in formation. On the other hand, if the fiber length is less than 1 mm, tensile strength of the supporting non-woven fabric lower, with result that it may be damaged during the formation of the solid electrolyte layer. The fiber length of the fiber other than the heat-fusible crimped composite fiber is also preferably in the same range as above.

The non-woven fabric for supporting a solid electrolyte of the present invention may contain, in addition to the heat-fusible crimped composite fiber and the fiber other than the heat-fusible crimped composite fiber, the following fiber, for example: a cellulose fiber, a pulped or fibrillated cellulose fiber, a fibrid of a synthetic resin, a pulped product of a synthetic resin, or an inorganic fiber. Examples of the inorganic fiber include glass, alumina, silica, ceramics, and rock wool. Examples of the cellulose fiber include natural cellulose and regenerated cellulose.

In a case where the non-woven fabric for supporting a solid electrolyte is the non-woven fabric A, the thickness of the non-woven fabric A is preferably not less than 10 μm, more preferably not less than 15 μm, and still more preferably not less than 20 μm. Meanwhile, the thickness is preferably not more than 35 μm, more preferably not more than 33 μm, and still more preferably not more than 30 μm. The non-woven fabric A with a thickness in the above-described range can maintain sufficient tensile strength as required in the step of applying the solid electrolyte slurry. Thus, there is no impairment in workability in each of the steps including the step of producing the non-woven fabric A. If the thickness of the non-woven fabric A is more than 35 μm, it may be difficult for the supporting non-woven fabric to be thoroughly filled with the solid electrolyte slurry. Further, it may be difficult to make the solid electrolyte layer thinner in the hot press step after the application of the solid electrolyte slurry, which may cause a decrease in the lithium ion conductivity of the solid electrolyte layer. Furthermore, it may be impossible to achieve a high-capacity battery. If the thickness of the non-woven fabric A is less than 10 μm, tensile strength of the supporting non-woven fabric lower so considerably, with result that the process performance may deteriorate in such a manner that the supporting non-woven fabric is damaged when being handled or applied with the solid electrolyte slurry. Further, the supporting non-woven fabric is so dense that it may have difficulty in being filled with the solid electrolyte slurry.

Ina case where the non-woven fabric for supporting a solid electrolyte is the non-woven fabric A, the density of the non-woven fabric A is preferably not less than 0.14 g/cm$^3$ and not more than 0.35 g/cm$^3$, more preferably not less than 0.15 g/cm$^3$ and not more than 0.32 g/cm$^3$, and still more preferably not less than 0.16 g/cm- and not more than 0.30 g/cm$^3$. If the density of the non-woven fabric A is less than 0.14 g/cm$^3$, tensile strength of the supporting non-woven fabric lower so considerably, with result that the process performance may deteriorate in such a manner that the supporting non-woven fabric is damaged when being handled or applied. If the density of the non-woven fabric A is more than 0.35 g/cm, the supporting non-woven fabric is so dense that it has a film-like form and becomes less impregnated with the solid electrolyte slurry, which may cause a decrease in the ion conductivity of the solid electrolyte sheet.

The non-woven fabric A of the present invention is preferably a wet-laid non-woven fabric produced by a productive wet paper making method. The wet paper making method for producing a wet-laid non-woven fabric includes the steps of: dispersing fibers in water to prepare a uniform paper making slurry; making the paper making slurry into wet paper by a paper machine; and drying the wet paper. Examples of the paper machine include a cylinder paper machine, a Fourdrinier paper machine, an inclined paper machine, an inclined short-wire paper machine, and a combined machine thereof. The step of producing a wet-laid non-woven fabric may include spunlacing, when needed. The wet-laid non-woven fabric may be subjected to a processing treatment such as a heat treatment, a calendar treatment, or a hot calendar treatment.

In the wet paper making method, there is a possibility, slight though it may be, that constituent fibers adhere to wires or a paper making blanket for transferring wet paper in the paper making machine, thereby creating hole defects (e.g., with a diameter ($\Phi$) of 0.2 to 0.8 mm) in a wet-laid non-woven fabric. To avoid this, it is necessary to take measures such as changing fibers to be blended, replacing wear-out parts for paper making, and adjusting production conditions. As a result of consideration by the present inventors, it has been found that the production of the non-woven fabric A with a basis weight of less than 4 g/m$^2$ tends to require a huge amount of time, effort and costs to take these measures. If the wet-laid non-woven fabric has hole defects, the solid electrolyte cannot be applied to the hole defect regions. Even if the solid electrolyte can be applied, it may fall off during the manufacturing processes of an all-solid-state battery. Thus, it is necessary to reduce hole defects.

In order to reduce hole defects, the supporting non-woven fabric is preferably composed of the non-woven fabric A and a non-woven fabric B laminated on at least one surface of the non-woven fabric A, the non-woven fabric B being made of nanofibers with an average fiber diameter of not more than 2 μm. In a case where the supporting non-woven fabric is composed of the laminated non-woven fabrics A and B, even if the non-woven fabric A has a hole defect, the non-woven fabric F serves to close the hole defect, allowing the solid electrolyte to be supported. Further, the non-woven fabric B which is made of nanofibers with an average fiber diameter of not more than 2 μm can be filled with the solid electrolyte more densely than the non-woven fabric A. Thus, by arranging the non-woven fabric B on the negative electrode side, it is also possible to suppress dendrite formation on the negative electrode.

The non-woven fabric B is produced preferably by a melt-blown method or an electrospinning method, more preferably by the electrospinning method, because it is capable of producing a non-woven fabric with a low basis weight. By laminating the non-woven fabric B, it is possible to obtain the non-woven fabric for supporting a solid electrolyte that is satisfactorily filled with the solid electrolyte, is suitable for achieving a thin solid electrolyte sheet, and has few hole defects.

The melt-blown method for producing the non-woven fabric B is not particularly limited, and a common melt-blown method can be used. According to the melt-blown method, a thermoplastic resin, wax and the like as raw material are melted by an extruder or the like. The melted thermoplastic resin and the like is introduced into a spinneret connected to an end of the extruder and discharged in a fibrous form through a spinning nozzle of the spinneret. Then, the discharged fibrous resin and the like is stretched by a heated gas discharged from a gas nozzle of the spinneret. As a result, the thermoplastic resin and the like is formed into a fine fibrous resin with an average fiber diameter of not more than 2 μm. The heated gas, which is not particularly limited, is air, for example.

The resin used to make the non-woven fabric B is usually a thermoplastic resin. Examples include: a polyethylene-based polymer such as high-, medium-, or low-density polyethylene or linear low-density polyethylene; a copolymer of propylene and another type of α-olefin such as a propylene-buten-1 random copolymer or a propylene-ethylene-buten-1 random copolymer; an amorphous polypropylene-based polymer such as soft polypropylene; and a polyolefin-based polymer such as poly 4-methylpentene-1. Other examples include polyester, an acrylic resin, polyvinyl alcohol, an ethylene-vinyl alcohol copolymer, an ethylene-vinyl acetate alcohol copolymer, low-melting polyester (modified polyester), polyvinyl chloride, and polystyrene. The non-woven fabric B may contain only one or two or more of these resins.

Among them, high-, medium-, or low-density polyethylene and a polypropylene-based polymer (polypropylene, a copolymer of propylene and another type of α-olefin, etc.) are preferable, and a polypropylene-based polymer is preferred from the viewpoint of excellent spinnability, mechanical strength, and chemical resistance.

The non-woven fabric B may contain wax in addition to the above-described thermoplastic resin. Examples of the wax include a propylene homopolymer, and a copolymer of propylene and another type of α-olefin. The non-woven fabric B may contain only one or two or more types of wax. The wax is particularly preferably a propylene homopolymer from the viewpoint of compatibility with the thermoplastic resin and spinnability. The non-woven fabric B containing the wax tends to have a smaller average fiber diameter.

The device for use in the melt-blown method is not particularly limited, and a common melt-blown device is available. The conditions of the melt-blown method (e.g., the temperature of the spinneret, the melting temperature of the thermoplastic resin and the like, and the temperature of the heated gas) are not particularly limited as long as a fibrous resin with the above-described average fiber diameter can be formed. The average fiber diameter can be adjusted by appropriately changing the size of the discharge outlet of the spinneret, the temperature of the spinneret, the melting temperature, the temperature and flow rate of the heated gas and the like.

The fibrous resin prepared by the melt-blown method is collected in the form of a web on the non-woven fabric A placed on a collection plate. The collection method is not particularly limited. The melt-blown method is performed while the non-woven fabric A placed on the collection plate and the spinneret of the melt-blown device are moved relative to each other, whereby the fibrous resin is formed continuously or intermittently. In this manner, the fibrous resin is deposited in the form of a web on the non-woven fabric A placed on the collection plate, with the fibers fused to one another.

Thus, a non-woven fabric is obtained in which the non-woven fabric B made of nanofibers with an average fiber diameter of not more than 2 μm is formed integrally on the non-woven fabric A.

The weight basis of the non-woven fabric B varies depending on the discharge amount and the movement speed of the non-woven fabric A placed on the collection plate.

The collection plate is not particularly limited as long as it is capable of carrying the supporting non-woven fabric to be produced and does not inhibit the formation of the non-woven fabric B by the melt-blown method. Examples of the collection plate include a perforated belt (conveyor net) and a perforated drum. Further, the collection of the fibrous resin may be facilitated by sucking air from the side opposite to the nozzle of the melt-blown device.

Next, a description will be given of the electrospinning method for producing the non-woven fabric B. According to the electrospinning method, a solution of a polymer compound as a raw material of nanofibers is applied with a high pressure, thereby spinning nanofibers. A device for performing the electrospinning method includes a syringe, a high voltage source, and a conductive collector.

The syringe includes a cylinder, a piston, and a capillary. The cylinder is a cylindrical part whose inside can be filled with the solution of the polymer compound as a raw material of nanofibers, and includes the capillary at its end. The inner diameter of the capillary is preferably 10 to 1000 µm. The piston is a columnar member that fits inside the cylinder. The cylinder, the piston and the capillary are combined such that the polymer compound solution in the cylinder is extruded from the capillary by moving the piston.

The high voltage source is a DC power source. The positive electrode of the high voltage source is connected to the syringe, so that it is electrically connected to the polymer solution in the syringe. The negative electrode of the high voltage source is grounded. The conductive collector is a grounded metallic plate. The conductive collector is arranged at a certain distance from a tip of the capillary in the syringe. The distance between the conductive collector and the tip of the capillary is preferably approximately 3 to 15 cm.

The electrospinning method using the above-described device includes: a voltage application step in which a voltage is applied between the syringe and the conductive collector; and an electrostatic spinning step in which the polymer compound solution is solidified to allow nanofibers to be deposited and electrostatically spun.

In the voltage application step, a voltage is applied between the cylinder and the conductive collector. The voltage to be applied to the polymer solution for carrying out electrostatic spinning is not particularly limited as long as it can maintain continuous spinning. Usually, the voltage is suitably in a range of 0.5 to 50 kV.

The inside of the syringe is filled with the solution of the polymer compound as a raw material of nanofibers. The solution of the polymer compound used in the present invention is not particularly limited as long as the polymer compound can be solubilized therein. Examples of the polymer compound include polyvinyl alcohol (PVA), polyacrylonitrile (PAN), and polyvinylidene fluoride (PVDF). Any of these polymer compounds may be used alone or in combination with one or more of the other polymer compounds.

A solvent in the polymer compound solution is not particularly limited as long as it completely dissolves the polymer compound such that the polymer compound is not redeposited during the electrostatic spinning step. Examples of the solvent include N,N-dimethylformamide, dimethylsulfoxide, N-methyl-2-pyrolidone, tetrahydrofuran, acetone, acetonitrile, and water. Any of these solvents may be used alone or in combination with one or more of the other solvents.

The polymer compound solution is extruded from the tip of the capillary. In the extruded solution, the solvent has been volatilized, allowing the polymer compound as a solute to be solidified. The polymer compound which is being solidified is elongated and deformed by a potential difference and formed into nanofibers, which are pulled toward the conductive collector. At this time, the non-woven fabric A is disposed on the surface of the conductive collector, so that the nanofibers with an average fiber diameter of not more than 2 µm are deposited on the surface of the non-woven fabric A.

The average fiber diameter of the nanofibers that make the non-woven fabric B is not more than 2 µm, preferably not more than 1.5 µm, and further preferably not more than 1.0 µm. The nanofibers with a smaller fiber diameter allow the resultant non-woven fabric B to serve to close a hole defect, if any, in the non-woven fabric A, even if it has a small basis weight. If the average fiber diameter of the nanofibers is more than 2 µm, the non-woven fabric B is required to have a higher basis weight, which makes the non-woven fabric B less impregnated with the solid electrolyte. If the basis weight is kept low, the non-woven fabric B is unable to close a hole defect.

The average fiber diameter of the nanofibers is measured by an electron microscope in the following manner: The surface of the non-woven fabric B is photographed at 1000-fold magnification; 100 fibers are selected at random from the constituent nanofibers; the width (diameter) of each of the selected fibers is measured; and the average of the measurements is taken as the average fiber diameter.

The basis weight of the non-woven fabric B of the present invention is preferably 1 to 5 $g/m^2$, more preferably 1 to 2 $g/m^2$. If the basis weight of the non-woven fabric B is less than 1 $g/m^2$, there is a possibility that a hole defect, if any, in the non-woven fabric A cannot be sufficiently closed, and that the basis weight cannot be controlled. On the other hand, if the basis weight of the non-woven fabric B is more than 5 $g/m^2$, the supporting non-woven fabric will be so thick with the dense non-woven fabric B that it may have difficulty in being filled with the solid electrolyte.

In a case where the non-woven fabric for supporting a solid electrolyte is a non-woven fabric in which the non-woven fabric A and the non-woven fabric B are laminated, the thickness of the non-woven fabric A is preferably not less than 10 µm, more preferably not less than 12 µm, and still more preferably not less than 15 µm. Also, the thickness is preferably not more than 25 µm, more preferably not more than 23 µm, and still more preferably not more than 20 µm. If the thickness of the non-woven fabric A is more than 25 µm, the supporting non-woven fabric may have difficulty in being filled with the solid electrolyte. If the thickness of the non-woven fabric A is less than 10 µm, tensile strength of the supporting non-woven fabric lower so considerably, with result that the process performance may deteriorate in such a manner that the supporting non-woven fabric is damaged when being handled or applied with the solid electrolyte slurry. Further, the supporting non-woven fabric will be so dense that it may have difficulty in being filled with the solid electrolyte slurry.

In a case where the non-woven fabric for supporting a solid electrolyte is a non-woven fabric in which the non-woven fabric A and the non-woven fabric B are laminated, the density of the non-woven fabric A is preferably not less than 0.14 $g/cm^3$ and not more than 0.35 $g/cm^3$, more preferably not less than 0.15 g/cm and not more than 0.32 $g/cm^3$, and still more preferably not less than 0.16 $g/cm^3$ and not more than 0.30 $g/cm^3$. If the density of the non-woven fabric A is less than 0.14 $g/cm^3$, tensile strength of the supporting non-woven fabric lower so considerably, with result that the process performance may deteriorate in such a manner that the supporting non-woven fabric is damaged when being handled or applied. If the density of the non-woven fabric A is more than 0.35 g/cm³, the supporting non-woven fabric will be so dense that it is less impregnated with the solid electrolyte slurry, which may cause a decrease in the ion conductivity of the solid electrolyte sheet.

The thickness of the non-woven fabric for supporting a solid electrolyte is preferably not less than 10 μm, more preferably not less than 15 μm, and still more preferably not less than 20 μm. Also, the thickness is preferably not more than 35 μm, more preferably not more than 33 μm, and still more preferably not more than 30 μm. The supporting non-woven fabric of the present invention with a thickness in the above-described range can maintain sufficient tensile strength as required in the step of applying the solid electrolyte slurry. Thus, there is no impairment in workability in each of the steps including the step of producing the non-woven fabric A. If the thickness of the supporting non-woven fabric is more than 35 μm, it may be difficult for the supporting non-woven fabric to be thoroughly filled with the solid electrolyte slurry. Further, it may be difficult to make the solid electrolyte layer thinner in the hot press step after the application of the solid electrolyte slurry, which may cause a decrease in the lithium ion conductivity of the solid electrolyte layer. Furthermore, it may be impossible to achieve a high-capacity battery. If the thickness of the supporting non-woven fabric is less than 10 μm, tensile strength of the supporting non-woven fabric lower so considerably, with result that the process performance may deteriorate in such a manner that the supporting non-woven fabric is damaged when being handled or applied with the solid electrolyte slurry. Further, the supporting non-woven fabric is so dense that it may have difficulty in being filled with the solid electrolyte slurry.

The density of the non-woven fabric for supporting a solid electrolyte is preferably not less than 0.14 g/cm³ and not more than 0.35 g/cm³, more preferably not less than 0.15 g/cm³ and not more than 0.32 g/cm³, and still more preferably not less than 0.16 g/cm³ and not more than 0.30 g/cm³. If the density of the supporting non-woven fabric is less than 0.14 g/cm³, tensile strength of the supporting non-woven fabric lower so considerably, with result that the process performance may deteriorate in such a manner that the supporting non-woven fabric is damaged when being handled or applied. If the density of the supporting non-woven fabric is more than 0.35 g/cm³, the supporting non-woven fabric is so dense that it has a film-like form and becomes less impregnated with the solid electrolyte slurry, which may cause a decrease in the ion conductivity of the solid electrolyte sheet.

EXAMPLES

Hereinafter, the present invention will be described by way of Examples; however, the present invention is not limited to these Examples. In Examples, the application amount refers to a dry application amount.

Example 1

<Production of Supporting Non-Woven Fabric>

80 parts by mass of a heat-fusible crimped composite fiber (core-sheath type with core: PP and sheath: PE, fineness: 0.2 dtex, fiber length: 3 mm, number of crimps: 14/inch) and 20 parts by mass of a PP fiber with a fineness of 0.3 dtex and a fiber length of 3 mm were dispersed in water with a pulper to prepare a uniform paper making slurry with a concentration of 0.5 mass %, from which a wet paper web was obtained by a cylinder paper machine, followed by drying with a cylinder dryer with a surface temperature of 133° C. Thus, a sheet was obtained. The thus-obtained sheet was subjected to a calendar treatment by a calendar device provided with a chrome-plated steel roll whose surface temperature was room temperature, and a resin roll with a Shore D hardness of 92, thereby producing a non-woven fabric (non-woven fabric A) for supporting a solid electrolyte with a basis weight of 5.0 g/m² and a thickness of 30 μm.

<Preparation of Solid Electrolyte Slurry>

A xylene solution of SBR (electrolyte layer binder) was added to a $Li_2S$—$P_2S_5$ (80:20 mol %) amorphous powder such that SBR was contained in an amount of 1 mass % relative to the mass of the amorphous powder, thereby preparing a primary mixed liquid. A xylene solution of NBR (electrolyte layer binder) was further added to the primary mixed liquid such that NBR was contained in an amount of 0.5 mass % relative to the mass of the amorphous powder, thereby preparing a secondary mixed liquid. Further, an appropriate amount of dehydrated xylene was added to the secondary mixed liquid for viscosity control, thereby preparing a tertiary mixed liquid. In order to increase the dispersibility of the powder, the tertiary mixed liquid, together with a zirconia ball with a diameter of 5 mm, was introduced into a kneading container such that the mixed liquid, the zirconia ball, and empty space each occupy one third of the total volume of the kneading container, thereby preparing a quaternary mixed liquid. The quaternary mixed liquid was introduced into a planetary centrifugal mixer and stirred for tree minutes at 3000 rpm, thereby preparing a solid electrolyte slurry.

<Production of Solid Electrolyte Sheet>

The non-woven fabric for supporting a solid electrolyte was continuously fed from above through a guide roller into an application tank with the above-described solid electrolyte slurry. In order for the supporting non-woven fabric to be immersed in the solid electrolyte slurry in the application tank until the non-woven fabric was thoroughly impregnated with the solid electrolyte, the supporting non-woven fabric was nipped between press rolls in the application tank, and then lifted through the guide roller. Thereafter, both surfaces of the supporting non-woven fabric were smoothed by a plastic blade applied thereto, so that an excess solid electrolyte slurry was scraped. The supporting non-woven fabric impregnated with the solid electrolyte was fed to a hot air dryer and dried from the both surfaces. Then, the resultant solid electrolyte supporting sheet was subjected to hot press at a temperature of 120° C. and a load of 5 t/cm, thereby producing a solid electrolyte sheet.

Example 2

The same treatment as in Example 1 was performed except that a heat-fusible crimped composite fiber (core-sheath type with core: PP and sheath: PE, fineness: 0.4 dtex, fiber length: 5 mm, number of crimps: 14/inch) was used, thereby producing a non-woven fabric for supporting a solid electrolyte with a basis weight of 5.0 g/m and a thickness of 33 μm. Next, a solid electrolyte sheet was produced in the same manner as in Example 1.

Example 3

The same treatment as in Example 1 was performed except that a heat-fusible crimped composite fiber (core-sheath type with core: PP and sheath: PE, fineness: 0.8 dtex, fiber length: 5 mm, number of crimps: 14/inch) was used, thereby producing a non-woven fabric for supporting a solid electrolyte with a basis weight of 5.3 g/m² and a thickness of 35 μm. Next, a solid electrolyte sheet was obtained in the same manner as in Example 1.

Example 4

The same treatment as in Example 1 was performed except that 70 parts of a heat-fusible crimped composite fiber (core-sheath type with core: PET and sheath: modified PET resin with a melting point of 110° C., fineness: 0.5 dtex, fiber length: 5 mm, number of crimps: 14/inch) and 30 parts of a stretched PET fiber with a fineness of 0.6 dtex and a fiber length of 5 mm were used, thereby producing a non-woven fabric for supporting a solid electrolyte with a basis weight of 5.2 g/m² and a thickness of 30 μm. Next, a solid electrolyte sheet was produced in the same manner as in Example 1.

Example 5

A solid electrolyte sheet was produced in the same manner as in Example 1 except that a non-woven fabric for supporting a solid electrolyte with a basis weight of 8.0 g/m² and a thickness of 27 μm was produced.

Example 6

The same treatment as in Example 1 was performed except that the number of crimps of the heat-fusible crimped composite fiber was 6/inch, thereby producing a non-woven fabric for supporting a solid electrolyte with a basis weight of 5.0 g/m² and a thickness of 25 μm. Next, a solid electrolyte sheet was produced in the same manner as in Example 1.

Example 7

The same treatment as in Example 1 was performed except that the number of crimps of the heat-fusible crimped composite fiber was 25/inch, thereby producing a non-woven fabric for supporting a solid electrolyte with a basis weight of 5.0 g/m² and a thickness of 34 μm. Next, a solid electrolyte sheet was produced in the same manner as in Example 1.

Example 8

The same treatment as in Example 1 was performed except that 60 parts of the heat-fusible crimped composite fiber used in Example 1 and 40 parts of the PP fiber used in Example 1 were used, thereby producing a non-woven fabric for supporting a solid electrolyte with a basis weight of 5.0 g/m² and a thickness of 30 μm. Next, a solid electrolyte sheet was produced in the same manner as in Example 1.

Example 9

The same treatment as in Example 1 was performed except that the number of crimps of the heat-fusible crimped composite fiber was 5/inch, thereby producing a non-woven fabric for supporting a solid electrolyte with a basis weight of 5.0 g/m² and a thickness of 20 μm. Next, a solid electrolyte sheet was produced in the same manner as in Example 1.

Example 10

The same treatment as in Example 1 was performed except that the number of crimps of the heat-fusible crimped composite fiber was 26/inch, thereby producing a non-woven fabric for supporting a solid electrolyte with a basis weight of 5.0 g/m² and a thickness of 36 μm. Next, a solid electrolyte sheet was produced in the same manner as in Example 1.

Example 11

The same treatment as in Example 1 was performed except that 100 parts of the heat-fusible crimped composite fiber used in Example 1 was used, thereby producing a non-woven fabric for supporting a solid electrolyte with a basis weight of 8.5 g/m² and a thickness of 27 μm. A solid electrolyte sheet was produced in the same manner as in Example 1.

Comparative Example 1

The same treatment as in Example 1 was performed except that 55 parts of the heat-fusible crimped composite fiber used in Example 1 and 45 parts of the PP fiber used in Example 1 were used, thereby producing a non-woven fabric for supporting a solid electrolyte with a basis weight of 5.0 g/m² and a thickness of 30 μm. Next, a solid electrolyte sheet was produced in the same manner as in Example 1.

Comparative Example 2

The same treatment as in Example 1 was performed except that 55 parts of the heat-fusible crimped composite fiber used in Example 4 and 45 parts of the stretched PET fiber used in Example 4 were used, thereby producing a non-woven fabric for supporting a solid electrolyte with a basis weight of 5.2 g/m² and a thickness of 38 μm. Next, a solid electrolyte sheet was produced in the same manner as in Example 1.

Comparative Example 3

The same treatment as in Example 1 was performed except that 100 parts of a heat-fusible composite fiber (straight type with no crimp, core-sheath type with core: PP and sheath: PE, fineness: 0.2 dtex, fiber length: 3 mm) was used, thereby producing a non-woven fabric for supporting a solid electrolyte with a basis weight of 8.0 g/m² and a thickness of 22 μm. Next, a solid electrolyte sheet was produced in the same manner as in Example 1.

Comparative Example 4

60 parts of a stretched PET fiber with a fineness of 0.6 dtex and a fiber length of 5 mm and 40 parts of an unstretched PET binder fiber with a fineness of 0.2 dtex and a fiber length of 3 mm were dispersed in water with a pulper to prepare a uniform paper making slurry with a concentration of 0.5 mass %, from which a wet paper web was obtained by a cylinder paper machine, followed by drying with a cylinder dryer with a surface temperature of 140° C. Thus, a sheet was obtained. The thus-obtained sheet was subjected to a calendar treatment by a calendar device provided with a chrome-plated steel roll whose surface temperature was room temperature, and a resin roll with a Shore D hardness of 92, thereby producing a non-woven fabric for supporting a solid electrolyte with a basis weight of 5.1 g/m² and a thickness of 23 μm.

The non-woven fabrics for supporting a solid electrolyte and the solid electrolyte sheets in Examples and Comparative Examples were measured and evaluated for physical properties. The results are shown in Tables 1 and 2.

<Basis Weight of Non-Woven Fabric>

The basis weight of the non-woven fabrics was measured in conformity with JIS P8124:2011.

<Thickness of Non-Woven Fabric>

The thickness at a load of 5 N was measured with an outside micrometer as specified in JIS B7502:2016.

<Air Permeability of Non-Woven Fabric>

A sample piece (100 mm in the flow direction×100 mm in the width direction) was cut from each of the non-woven fabrics for supporting a solid electrolyte for the measurement of air flow resistance using an air permeability tester (product name: KES-F8-API, manufactured by KATO TECH CO., LTD.) Air permeability was obtained by Calculation Formula 1 below.

$$\text{Air permeability (cm}^3/\text{cm}^2\cdot\text{sec)}=12.5/\text{air flow resistance} \quad \text{—Calculation Formula 1—}$$

<Process Performance>

For the production of the solid electrolyte sheet, the non-woven fabric for supporting a solid electrolyte was continuously immersed in the solid electrolyte slurry, followed by nipping between press rolls and drying. At this time, the supporting non-woven fabric was visually observed as to whether the fabric shrank in the width direction and was wrinkled during the process due to inability to withstand the tension applied in the step. Evaluations were made based on the following criteria.

∘: Neither shrinkage in the width direction nor wrinkle was observed in the supporting non-woven fabric during the process.

Δ: No wrinkle was observed while slight shrinkage in the width direction occurred in the supporting non-woven fabric during the process.

x: Both shrinkage in the width direction and wrinkles were observed in the supporting non-woven fabric during the process.

<Impregnating Ability of Solid Electrolyte>

The solid electrolyte sheet was observed in cross-section by a scanning electron microscope in connection with the time it took for the solid electrolyte slurry to permeate the supporting non-woven fabric. The state of impregnation of the supporting non-woven fabric with the solid electrolyte was evaluated based on the following criteria.

∘: The supporting non-woven fabric was thoroughly and sufficiently impregnated with the solid electrolyte, as the solid electrolyte slurry permeated the supporting non-woven fabric shortly after its immersion.

Δ: The supporting non-woven fabric was thoroughly impregnated with the solid electrolyte, though a longer time was required to allow the solid electrolyte slurry to permeate the supporting non-woven fabric by reducing the application speed.

x: The supporting non-woven fabric was not thoroughly impregnated with the solid electrolyte, even though a longer time was spent to allow the solid electrolyte slurry to permeate the supporting non-woven fabric by reducing the application speed.

<Crack in Solid Electrolyte Layer>

The solid electrolyte sheet was observed in cross-section by a scanning electron microscope. The state of the solid electrolyte was evaluated as to the presence or absence of a crack based on the following criteria.

∘: No crack was observed in the vicinity of fibers in the solid electrolyte layer.

Δ: A slight crack was observed in the vicinity of fibers in the solid electrolyte layer.

x: A large crack was observed in the vicinity of fibers in the solid electrolyte layer.

<Self-Sustainability of Solid Electrolyte Sheet>

The solid electrolyte sheet was die-cut with a 100 mm×100 mm Thomson blade. The thus-obtained solid electrolyte sheet was grasped with tweezers and swung, after which a visual observation was made as to self-sustainability. Evaluations were made based on the following criteria.

∘: The sheet kept the shape with no falling of the solid electrolyte.

Δ: The sheet kept the shape though the solid electrolyte slightly fell off.

x: The solid electrolyte fell off from the non-woven fabric.

<Flexibility of Solid Electrolyte Sheet>

The solid electrolyte sheet was wrapped around a round bar with a diameter (Φ) of 3 cm, after which a visual observation was made as to whether or not the sheet was bent and the solid electrolyte fell off. Evaluations were made based on the following criteria.

∘: The sheet was not bent with no falling of the solid electrolyte.

Δ: The sheet was slightly bent with slight falling of the solid electrolyte.

x: The sheet was bent with falling of the solid electrolyte.

TABLE 1

| | | | Ex.* 1 | Ex. 2 | Ex. 3 | Ex. 4 | Ex. 5 | Ex. 6 | Ex. 7 | Ex. 8 |
|---|---|---|---|---|---|---|---|---|---|---|
| Fiber blending | Heat-fusible crimped composite fiber (PP/PE core-sheath type): 0.2 dtex; 3 mm | Pts. mass | 80 | — | — | — | 80 | 80 | 80 | 60 |
| | Heat-fusible crimped composite fiber (PP/PE core-sheath type): 0.4 dtex; 5 mm | Pts. mass | — | 80 | — | — | — | — | — | — |
| | Heat-fusible crimped composite fiber (PP/PE core-sheath type): 0.8 dtex; 5 mm | Pts. mass | — | — | 80 | — | — | — | — | — |
| | Heat-fusible crimped composite fiber (PET/modified PETcore-sheath type): 0.5 dtex; 5 mm | Pts. mass | — | — | — | 70 | — | — | — | — |
| | PP fiber: 0.3 dtex; 3 mm | Pts. mass | 20 | 20 | 20 | — | 20 | 20 | 20 | 40 |
| | Stretched PET fiber; 0.6 dtex; 5 mm | Pts. mass | — | — | — | 30 | — | — | — | — |
| | Number of crimps of heat-fusible crimped composite fiber | Crimps/inch | 14 | 14 | 14 | 14 | 14 | 6 | 25 | 14 |

TABLE 1-continued

|  |  |  | Ex.* 1 | Ex. 2 | Ex. 3 | Ex. 4 | Ex. 5 | Ex. 6 | Ex. 7 | Ex. 8 |
|---|---|---|---|---|---|---|---|---|---|---|
| Physical property | Basis weight of supporting non-woven fabric (non-woven fabric A) | g/m² | 5.0 | 5.0 | 5.3 | 5.2 | 8.0 | 5.0 | 5.0 | 5.0 |
|  | Thickness of supporting non-woven fabric (non-woven fabric A) | μm | 30 | 33 | 35 | 30 | 27 | 25 | 34 | 30 |
|  | Air permeability of supporting non-woven fabric (non-woven fabric A) | cm³/cm²·sec | 350 | 870 | 1760 | 2450 | 155 | 300 | 400 | 380 |
| Evaluation | Process performance | — | ○ | ○ | ○ | ○ | ○ | ○ | ○ | Δ |
|  | Impregnating ability of solid electrolyte | — | ○ | ○ | ○ | ○ | ○ | ○ | ○ | ○ |
|  | Crack in solid electrolyte layer | — | ○ | ○ | Δ | ○ | ○ | ○ | ○ | ○ |
|  | Self-sustainability of solid electrolyte sheet | — | ○ | ○ | ○ | ○ | ○ | ○ | ○ | ○ |
|  | Flexibility of solid electrolyte sheet | — | ○ | ○ | ○ | ○ | ○ | ○ | ○ | ○ |

*Ex.: Example

TABLE 2

|  |  |  | Ex. 9 | Ex. 10 | Ex. 11 | Com. Ex.* 1 | Com. Ex. 2 | Com. Ex. 3 | Com. Ex. 4 |
|---|---|---|---|---|---|---|---|---|---|
| Fiber blending | Heat-fusible (crimped) composite fiber (PP/PE core-sheath type): 0.2 dtex; 3 mm | Pts. mass | 80 | 80 | 100 | 55 | — | 100 | — |
|  | Heat-fusible aimped composite fiber (PET/modified PET core-sheath type): 0.5 dtex; 5 mm | Pts. mass | — | — | — | — | 55 | — | — |
|  | PP fiber: 0.3 dtex; 3 mm | Pts. mass | 20 | 20 | — | 45 | — | — | — |
|  | Stretched PET fiber: 0.6 dtex; 5 mm | Pts. mass | — | — | — | — | 45 | — | 60 |
|  | Unstretched PET fiber: 0.2 dtex; 3 mm | Pts. mass | — | — | — | — | — | — | 40 |
|  | Number of crimps of heat-fusible crimped composite fiber | Crimps/inch | 5 | 26 | 14 | 14 | 14 | — | — |
| Physical property | Basis weight of supporting non-woven fabric (non-woven fabric A) | g/m² | 5.0 | 5.0 | 8.5 | 5.0 | 5.2 | 8.0 | 5.1 |
|  | Thickness of supporting non-woven fabric (non-woven fabric A) | μm | 20 | 36 | 27 | 30 | 38 | 22 | 23 |
|  | Air permeability of supporting non-woven fabric (non-woven fabric A) | cm³/cm²·sec | 290 | 420 | 140 | 390 | 2650 | 140 | 2600 |
| Evaluation | Process performance | — | ○ | Δ | ○ | ○ | x | ○ | Δ |
|  | Impregnating ability of solid electrolyte | — | Δ | ○ | Δ | ○ | ○ | x | ○ |
|  | Crack in solid electrolyte layer | — | ○ | ○ | ○ | Δ | x | ○ | x |
|  | Self-sustainability of solid electrolyte sheet | — | ○ | ○ | Δ | ○ | Δ | o | ○ |
|  | Flexibility of solid electrolyte sheet | — | ○ | ○ | ○ | ○ | ○ | ○ | ○ |

*Com. Ex.: Comparative Example

As shown in Table 1, the non-woven fabric for supporting a solid electrolyte produced in each of Examples 1 to 11 is the non-woven fabric A containing the heat-fusible crimped composite fiber in an amount of not less than 60 mass % and not more than 100 mass %. The non-woven fabric for supporting a solid electrolyte in each of Examples 1 to 11 has high tensile strength and excellent process performance. In addition, this non-woven fabric is satisfactorily impregnated with the solid electrolyte, and the solid electrolyte layer is almost free of cracks because the heat-fusible crimped composite fiber is plastically deformed in the hot press step to make the solid electrolyte layer thinner. Besides, the solid electrolyte sheet in each of Examples 1 to 11 is excellent in self-sustainability and flexibility.

A comparison is made among Examples 1 to 3. The heat-fusible crimped composite fiber used in each of Examples 1 and 2 is a core-sheath type heat-fusible crimped composite fiber whose core is a polypropylene-based polymer and sheath is a polyolefin-based polymer with a lower melting point than the polypropylene-based polymer as the core, and has a fineness in a range of 0.1 to 0.4 dtex. The supporting non-woven fabric in each of Examples 1 and 2 has no crack in the solid electrolyte layer.

A comparison is made between Examples 1 and 6. The supporting non-woven fabric in Example 1 containing the heat-fusible crimped composite fiber in an amount of not less than 80 mass % is higher in tensile strength and more excellent in process performance.

A comparison is made among Examples 1, 6, 7, 9 and 10. The number of crimps of the heat-fusible crimped composite fiber in each of Examples 1, 6 and 7 is in a range of 6 to 25/inch, while the number of crimps of the heat-fusible crimped composite fiber in Example 9 is 5/inch. The supporting non-woven fabric in each of Examples 1, 6 and 7 is bulkier and, thus, more satisfactorily impregnated with the solid electrolyte than the supporting non-woven fabric in Example 9. Further, as compared with the supporting non-woven fabric in Example 10 where the number of crimps of the heat-fusible crimped composite fiber is more than 25/inch, the supporting non-woven fabric in each of Examples 1, 6 and 7 is higher in fabric formation and tensile strength and more excellent in process performance.

A comparison is made between Examples 5 and 11. The supporting non-woven fabric in Example 11 has an air permeability of less than 150 cm&/cm²·sec. Thus, in order to allow the solid electrolyte slurry to thoroughly permeate this supporting non-woven fabric, the application speed needs to be reduced as compared with that in Example 5. Further, the supporting non-woven fabric in Example 11 is so dense that the solid electrolyte slightly falls off.

The supporting non-woven fabric in each of Comparison Examples 1 and 2 containing the heat-fusible crimped composite fiber in an amount of less than 60 mass (is lower in tensile strength, resulting in deteriorated process performance. Further, the supporting non-woven fabric in Comparison Example 2 has a large crack in the vicinity of fibers in the solid electrolyte layer.

The supporting non-woven fabric in Comparison Example 3 containing no heat-fusible crimped composite fiber is so dense that it has difficulty in being thoroughly impregnated with the solid electrolyte.

The supporting non-woven fabric in Comparison Example 4 containing no heat-fusible crimped composite fiber is excellent in air permeability and satisfactorily impregnated with the solid electrolyte. However, this supporting non-woven fabric is lower in tensile strength, resulting in deteriorated process performance. In the hot press step, it is difficult to make the solid electrolyte layer thinner, and it is easily cracked.

Example 12

<Production of Non-Woven Fabric A>

80 parts by mass of a heat-fusible crimped composite fiber (core-sheath type with core: PP and sheath: PE, fineness: 0.2 dtex, fiber length: 3 mm, number of crimps: 14/inch) and 20 parts by mass of a PP fiber with a fineness of 0.3 dtex and a fiber length of 3 mm were dispersed in water with a pulper to prepare a uniform paper making slurry with a concentration of 0.5 mass %, from which a wet paper web was obtained by a cylinder paper machine, followed by drying with a cylinder dryer with a surface temperature of 133° C. Thus, a non-woven fabric A with a basis weight of 3.5 g/m² was produced. From the observation of the non-woven fabric A, it was found that a hole defect with a diameter (Φ) of 0.2 to 0.8 mm was present.

<Production of Supporting Non-Woven Fabric>

A melt-blown non-woven fabric manufacturing device was used to discharge a polypropylene-based polymer, whereby a non-woven fabric B with an average fiber diameter of 1.5 μm and a basis weight of 1.2 g/m² was laminated on one side of the non-woven fabric A. Then, the thus-obtained laminated fabric was slightly nipped by a calendar provided with a chrome-plated steel roll whose surface temperature was room temperature, and a resin roll with a Shore A hardness of 70, thereby producing a non-woven fabric for supporting a solid electrolyte with a basis weight of 4.7 g/m and a thickness of 30 μm.

<Preparation of Solid Electrolyte Slurry>

A xylene solution of SBR (electrolyte layer binder) was added to a Li₂S—P₂S₅ (80:20 mol %) amorphous powder such that SBR was contained in an amount of 1 mass % relative to the mass of the amorphous powder, thereby preparing a primary mixed liquid. A xylene solution of NBR (electrolyte layer binder) was further added to the primary mixed liquid such that NBR was contained in an amount of 0.5 mass % relative to the mass of the amorphous powder, thereby preparing a secondary mixed liquid. Further, an appropriate amount of dehydrated xylene was added to the secondary mixed liquid for viscosity control, thereby preparing a tertiary mixed liquid. In order to increase the dispersibility of the powder, the tertiary mixed liquid, together with a zirconia ball with a diameter of 5 mm, was introduced into a kneading container such that the mixed liquid, the zirconia ball, and empty space each occupy one third of the total volume of the kneading container, thereby preparing a quaternary mixed liquid. The quaternary mixed liquid was introduced into a planetary centrifugal mixer and stirred for three minutes at 3000 rpm, thereby preparing a solid electrolyte slurry.

<Production of Solid Electrolyte Sheet>

The non-woven fabric for supporting a solid electrolyte was continuously fed from above through a guide roller into an application tank with the above-described solid electrolyte slurry. In order for the supporting non-woven fabric to be immersed in the solid electrolyte slurry in the application tank until the non-woven fabric was thoroughly impregnated with the solid electrolyte, the supporting non-woven fabric was nipped between press rolls in the application tank, and then lifted through the guide roller. Thereafter, both surfaces of the supporting non-woven fabric were smoothed by a plastic blade applied thereto, so that an excess solid electrolyte slurry was scraped. The supporting non-woven fabric impregnated with the solid electrolyte was fed to a hot air dryer and dried from the both surfaces. Then, the resultant solid electrolyte supporting sheet was subjected to hot press at a temperature of 120° C. and a load of 5 t/cm², thereby producing a solid electrolyte sheet.

Example 13

An electrospinning manufacturing device was used to subject a polymer solution of polyvinyl alcohol to electrostatic spinning for forming nanofibers with an average fiber diameter of 0.6 μm. The nanofibers thus obtained were sprayed on one surface of the non-woven fabric A with a basis weight of 3.5 g/m² produced in Example 12, whereby a non-woven fabric B with a basis weight of 1.2 g/m² was laminated on the one surface of the non-woven fabric A. Then, the thus-obtained laminated fabric was slightly nipped by a calendar provided with a chrome-plated steel roll whose surface temperature was room temperature, and a resin roll with a Shore A hardness of 70, thereby producing a non-woven fabric for supporting a solid electrolyte with a basis weight of 4.7 g/m² and a thickness of 31 μm. Subsequently, a solid electrolyte sheet was produced in the same manner as in Example 12.

Example 14

The same treatment as in Example 12 was performed except that the basis weight was 3.0 g/m², thereby producing a non-woven fabric A. From the observation of the non-woven fabric A, it was found that a hole defect with a diameter (Φ) of 0.2 to 0.8 mm was present. An electrospinning manufacturing device was used to subject a polymer solution of polyvinyl alcohol to electrostatic spinning for forming nanofibers with an average fiber diameter of 0.6 μm. The nanofibers thus obtained were sprayed on both surfaces of the non-woven fabric A, whereby a non-woven fabric B with a basis weight of 1.0 g/m² was laminated on the both surfaces of the non-woven fabric A. Then, the thus-obtained laminated fabric was slightly nipped by a calendar provided with a chrome-plated steel roll whose surface temperature was room temperature, and a resin roll with a Shore A hardness of 70, thereby producing a non-woven fabric for supporting a solid electrolyte with a basis weight of 5.0 g/m² and a thickness of 34 μm. Subsequently, a solid electrolyte sheet was produced in the same manner as in Example 12.

The non-woven fabrics for supporting a solid electrolyte and the solid electrolyte sheets in Examples and Comparative Examples were measured and evaluated for physical properties. The results are shown in Table 3.

<Presence or Absence of Hole Defect>

The produced solid electrolyte sheets were visually observed as to whether the sheets still had a hole defect by being unable to support the solid electrolyte in a region corresponding to the hole defect present in the non-woven fabric A. A sheet with a hole defect is of no use as a solid electrolyte sheet.

TABLE 3

| | | | Ex. 12 | Ex. 13 | Ex. 14 |
|---|---|---|---|---|---|
| Non-woven fabric A | Heat-fusible crimped composite fiber (PP/PE core-sheath type): 0.2 dtex; 3 mm | Pts. mass | 80 | 80 | 30 |
| | PP fiber: 0.3 dtex; 3 mm | Pts. mass | 20 | 20 | 20 |
| | Number of crimps of core-sheath type heat-fusible composite fiber | Crimps/inch | 14 | 14 | 14 |
| | Basis weight of non-woven fabric A | g/m² | 3.5 | 3.5 | 3.0 |
| Non-woven fabric B | Method for producing non-woven fabric B | | M* | E** | E |
| | Basis weight of non-woven fabric B (one surface) | g/m² | 1.2 (one surface) | 1.2 (one surface) | 1.0 (both surfaces) |
| | Average fiber diameter | μm | 1.5 | 0.6 | 0.3 |
| Physical property Evaluation | Basis weight of supporting non-woven fabric | g/m² | 4.7 | 4.7 | 5.0 |
| | Thickness of supporting non-woven fabric | μm | 30 | 31 | 34 |
| | Presence/absence of hole defect | — | None | None | None |
| | Process performance | — | ○ | ○ | ○ |
| | Impregnating ability of solid electrolyte | — | ○ | ○ | ○ |
| | Crack in solid electrolyte layer | — | ○ | ○ | ○ |
| | Self-sustainability of solid electrolyte sheet | — | ○ | ○ | ○ |
| | Flexibility of solid electrolyte sheet | — | ○ | ○ | ○ |

*M: Melt-blown method;
**E: Electrospinning method

As shown in Table 3, the non-woven fabric for supporting a solid electrolyte produced in each of Examples 12 to 14 is composed of the non-woven fabric A containing the heat-fusible crimped composite fibers and the non-woven fabric B containing the nanofibers with an average fiber diameter of not more than 2 μm, which is laminated on at least one surface of the non-woven fabric A. Although the non-woven fabric A has a hole defect, the non-woven fabric B serves to close the hole defect, allowing the solid electrolyte to be supported. Further, this non-woven fabric for supporting a solid electrolyte has high tensile strength and excellent process performance. In addition, the non-woven fabric is satisfactorily impregnated with the solid electrolyte, and the solid electrolyte layer is almost free of cracks because the heat-fusible crimped composite fiber is plastically deformed in the hot press step to make the solid electrolyte layer thinner. Besides, the solid electrolyte sheet in each of Examples 12 to 14 is excellent in self-sustainability and flexibility.

INDUSTRIAL APPLICABILITY

The non-woven fabric for supporting a solid electrolyte, and the solid electrolyte sheet of the present invention are suitable for use in all-solid-state lithium batteries.

The invention claimed is:

1. A non-woven fabric for supporting a solid electrolyte, being a non-woven fabric A in which heat-fusible composite fibers with a crimp are contained in an amount of not less than 60 mass % and not more than 100 mass % and are heat-fused, wherein the non-woven fabric A has an air permeability of 150 to 2500 cm³/cm²·sec.

2. The non-woven fabric for supporting a solid electrolyte according to claim 1, wherein the number of crimps of each of the heat-fusible composite fibers with a crimp is 6 to 25/inch.

3. The non-woven fabric for supporting a solid electrolyte according to claim 1, wherein each of the heat-fusible composite fibers with a crimp is a core-sheath type heat-fusible composite fiber whose core comprises a polypropylene-based polymer and sheath comprises a polyolefin-based polymer with a lower melting point than the polypropylene-based polymer as the core, and has a fineness of 0.1 to 0.4 dtex.

4. The non-woven fabric for supporting a solid electrolyte according to claim 1, wherein a non-woven fabric B made of nanofibers with an average fiber diameter of not more than 2 μm is laminated on at least one surface of the non-woven fabric A.

5. The non-woven fabric for supporting a solid electrolyte according to claim 4, wherein the non-woven fabric B is a non-woven fabric formed by a melt-blown method or an electrospinning method.

6. A solid electrolyte sheet comprising: a non-woven fabric for supporting a solid electrolyte according to claim 1; and a solid electrolyte supported in the non-woven fabric for supporting a solid electrolyte.

* * * * *